(12) United States Patent
Haertel et al.

(10) Patent No.: US 10,737,807 B2
(45) Date of Patent: Aug. 11, 2020

(54) POINTING MECHANISM FOR USE IN AN ELECTRIC PROPULSION SYSTEM OF A SPACECRAFT AND ELECTRIC PROPULSION SYSTEM FOR USE IN A SPACECRAFT

(71) Applicant: Airbus Defence and Space GmbH, Taufkirchen (DE)

(72) Inventors: Frank Haertel, Oberteuringen (DE); Harald Langenbach, Salem (DE); Christoph Maxmilian Von Lewinski, Stuttgart (DE); Sebastian Schwarz, Immenstaad (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 389 days.

(21) Appl. No.: 15/830,563

(22) Filed: Dec. 4, 2017

(65) Prior Publication Data
US 2018/0155064 A1 Jun. 7, 2018

(30) Foreign Application Priority Data

Dec. 5, 2016 (EP) ..................................... 16202154

(51) Int. Cl.
*B64G 1/24* (2006.01)
*B64G 1/40* (2006.01)
*B64G 1/26* (2006.01)
(52) U.S. Cl.
CPC ............... *B64G 1/24* (2013.01); *B64G 1/244* (2019.05); *B64G 1/26* (2013.01); *B64G 1/405* (2013.01)

(58) Field of Classification Search
CPC . B64G 1/24; B64G 1/26; B64G 1/405; B64G 1/244
See application file for complete search history.

(56) References Cited

U.S. PATENT DOCUMENTS 3,205,657 A 9/1965 Tumavicus
3,948,470 A * 4/1976 Perkins .................... B64G 1/26
244/3.22

(Continued)

FOREIGN PATENT DOCUMENTS

AT 507213 3/2010
EP 0568209 11/1993

(Continued)

OTHER PUBLICATIONS

European Search Report, dated Jun. 7, 2017, priority document.

*Primary Examiner* — Rodney A Bonnette
(74) *Attorney, Agent, or Firm* — Greer, Burns & Crain, Ltd.

(57) ABSTRACT

A pointing mechanism for use in an electric propulsion system of a spacecraft, the pointing mechanism comprises a mobile plate adapted to receive a thruster and defining a thrust vector of the thruster received on the mobile plate. The pointing mechanism further comprises a rotary actuator coupled to the mobile plate by means of a connecting element, the rotary actuator being configured to rotate the connecting element about a rotational axis of the rotary actuator such that the thrust vector defined by the mobile plate rotates about the rotational axis, wherein the thrust vector is inclined relative to the rotational axis.

20 Claims, 2 Drawing Sheets

(56) References Cited

U.S. PATENT DOCUMENTS

| | | | | |
|---|---|---|---|---|
| 5,349,532 A | * | 9/1994 | Tilley | B64G 1/26 244/164 |
| 2013/0292516 A1 | * | 11/2013 | Celerier | B64G 1/26 244/158.6 |
| 2014/0361123 A1 | * | 12/2014 | Celerier | B64G 1/40 244/158.6 |
| 2014/0361124 A1 | | 12/2014 | Celerier | |
| 2015/0001345 A1 | | 1/2015 | Polle | |
| 2019/0210744 A1 | * | 7/2019 | Kawamura | B64G 1/242 |

FOREIGN PATENT DOCUMENTS

| | | |
|---|---|---|
| GB | 875205 | 8/1961 |
| GB | 960106 | 6/1964 |

\* cited by examiner

POINTING MECHANISM FOR USE IN AN ELECTRIC PROPULSION SYSTEM OF A SPACECRAFT AND ELECTRIC PROPULSION SYSTEM FOR USE IN A SPACECRAFT

CROSS-REFERENCES TO RELATED APPLICATIONS

This application claims the benefit of the European patent application No. 16202154.7 filed on Dec. 5, 2016, the entire disclosures of which are incorporated herein by way of reference.

BACKGROUND OF THE INVENTION

The present invention relates to a pointing mechanism for use in an electric propulsion system of a spacecraft and an electric propulsion system for use in a spacecraft which is equipped with a pointing mechanism of this kind.

In general, electric propulsion systems are used for spacecraft propulsion which enable movement and maneuvering of a spacecraft equipped therewith. Specifically, electric propulsion systems are usually equipped with at least one electric thruster, such as an ion engine, which, upon accelerating ions or plasma, generates thrust acting on the spacecraft. In order to optimize electric thruster propellant resources, to limit a number of electric thrusters used within an electric propulsion system, and to enable advanced attitude and orbit maneuvering, such systems are equipped with a pointing mechanism, so-called electric propulsion pointing mechanism (EPPM), configured to direct a thrust vector generated by the at least one electric thruster of the electric propulsion system in a desired direction relative to a center of gravity of the spacecraft. The pointing mechanism comprises a mobile plate for receiving a thruster which is supported movably relative to a spacecraft structure. Specifically, for accelerating a spacecraft, as opposed to a maneuvering movement of the spacecraft, currently deployed pointing mechanisms are adapted to perfectly align the thus generated thrust vector such that it passes through a center of gravity of the spacecraft. As a result, to allow for a multi-axis alignment of the thrust vector of the electric propulsion system, the pointing mechanism is typically provided with at least two degrees of freedom.

For example, pointing mechanisms in the form of a so-called Gough-Stewart platform are known, in which the mobile plate is supported by six actuators mounted to a spacecraft structure which are attached in pairs to three positions on the mobile plate. In this way, the mobile plate is provided with six degrees of freedom, i.e., the mobile plate can be moved translationally along and rotably around the spacecraft's principal axes, namely the roll, pitch and yaw axes.

Further, pointing mechanisms are known, in which the mobile plate is mounted on a pair of gimbals to allow rotating the thrust vector generated by a thruster about both the pitch and the yaw axes of the spacecraft.

AT 507 213 A4 2010-03-15 discloses a pointing mechanism comprising a mobile plate which is driven by at least two rotary actuators connected in series, the rotational axes of which are disposed in parallel and displaced to one another.

The center of gravity of a spacecraft, e.g., due to propellant consumption, usually changes during the operation of the spacecraft. To that end, also the thrusters itself are subjected to a misalignment, e.g., due to forces acting thereon during a start of the spacecraft, abrasion, etc. As a result, such systems require a plurality of highly precise sensors and actuators for aligning the at least one thruster, thereby imposing computing effort on a spacecraft's control system, i.e., an attitude and orbit control system (AOCS).

SUMMARY OF THE INVENTION

The invention is directed at an object of providing a pointing mechanism for use in an electric propulsion system of a spacecraft with a relatively simple and lightweight design. Furthermore, the invention is directed at an object of providing an electric propulsion system for use in a spacecraft which is equipped with a pointing mechanism of this kind.

A pointing mechanism for use in an electric propulsion system of a spacecraft comprises a mobile plate adapted to receive a thruster, in particular a thruster of the electric propulsion system. The proposed pointing mechanism may be used in any spacecraft, such as an orbiting satellite or any other spacecraft system, which may be equipped with an electric propulsion system. In this context, the term "electric propulsion system" generally refers to an electrically powered spacecraft propulsion system which uses electrical energy to accelerate or maneuver a spacecraft. Most of these kinds of spacecraft propulsion systems work by electrically expelling propellants at high velocity. Specifically, the electric propulsion system may comprise an ion or plasma driver, such as an ion thruster, in which a propellant, e.g., xenon, is ionized and then, upon being directed through an electrical field, is accelerated. Thereafter, the thus accelerated gas particles are electrically neutralized and ejected in form of a beam at high velocity, e.g., between 10 to 130 km/s, in order to generate thrust and thus to provide impulse energy. Preferably, the thruster received, i.e., mounted on the mobile plate is an ion thruster. The mobile plate may be adapted to receive, i.e., carry only one thruster. It is, however, also conceivable that the mobile plate is adapted to receive, i.e., carry two or more thrusters.

The mobile plate defines a thrust vector of the thruster received, i.e., mounted on the mobile plate. In this context, the term "thrust vector" refers to a force generated by the at least one thruster received, i.e., mounted on the mobile plate upon ejecting the accelerated propellants. Thus, the thrust vector defines both the absolute value and direction of a force acting on the mobile plate which results from operating at least one thruster received, i.e., mounted thereon. The generated thrust vector of the thruster received, i.e., mounted on the mobile plate is preferably intended to influence the attitude and the trajectory of the spacecraft equipped with the electric propulsion system, i.e., to change a linear and/or angular velocity thereof.

The pointing mechanism further comprises a rotary actuator. The rotary actuator is preferably adapted to control the attitude and the trajectory of the spacecraft, i.e., the linear and angular velocity thereof, by aligning the thrust vector defined by the mobile plate relative to a spacecraft. Specifically, the rotary actuator is coupled to the mobile plate by means of a connecting element, the rotary actuator being adapted to rotate the connecting element about a rotational axis of the rotary actuator such that the thrust vector defined by the mobile plate rotates about the rotational axis, wherein the thrust vector is inclined relative to the rotational axis. Thus, upon rotating the connecting element, the rotary actuator is adapted to change the direction of the thrust vector defined by the mobile plate relative to the spacecraft.

In general, an attitude and trajectory of a spacecraft equipped with a pointing mechanism is controlled by aligning the thrust vector relative to a center of gravity of the spacecraft. For example, for changing a linear velocity of a spacecraft, the thrust vector is typically aligned in such a way that it passes through the center of gravity of the spacecraft. In this way, the spacecraft can be prevented from being subjected to torques leading to an angular acceleration and thus to an angular velocity. By contrast, for changing an angular velocity of the spacecraft, the thrust vector is typically aligned in such a way that it does not pass through the center of gravity of the spacecraft. As a result, a torque acting on the center of gravity of the spacecraft is generated which induces an angular acceleration thereof.

By providing the mobile plate defining a thrust vector inclined relative to the rotational axis of the rotary actuator, only one degree of freedom, i.e., the rotational freedom about the rotational axis, is required to change the direction of a thrust vector in relation to all of the spacecraft's principal axes. In other words, as in the proposed pointing mechanism the thrust vector is inclined relative to the rotational axis of the rotary actuator, the pointing mechanism ensures that, upon rotating the connecting element by means of the rotary actuator, the thrust vector changes its direction in relation to each of the spacecraft's principal axes. This has the advantageous effect that the pointing mechanism can be provided with a relatively compact and simple design, while a position of the thrust vector in relation to a center of gravity of the spacecraft can be changed in a relatively effective manner.

According to a further aspect of the present invention, in order to control a linear velocity of a spacecraft, it is not required to perfectly align the thrust vector so as to pass through the center of gravity of the spacecraft. A linear acceleration of the spacecraft can also be controlled by frequently switching the pointing mechanism between a plurality of operating positions, in each of which the thrust vector does not pass through the center of gravity, thereby inducing both a linear acceleration and an angular acceleration of the spacecraft. As to substance, in each of the plurality of operating positions of the pointing mechanism, the thrust vector may be directed in such a way that it comprises a translational force component and an angular force component acting on the center of gravity of the spacecraft. The translational force component passes through the center of gravity of the spacecraft, thereby inducing a linear acceleration thereof, whereas the angular force component is directed perpendicular to the translational force component, thereby inducing an angular acceleration of the spacecraft. Across the plurality of operating positions, the translational force component may be directed in the same direction, while the direction of the angular force component may be directed in opposite directions. In other words, the plurality of operating positions is configured to selectively generate torques which are directed in opposite directions so as to induce opposite angular accelerations.

As a result, by frequently switching the operating positions of the pointing mechanism, a continuous linear acceleration of the spacecraft can be achieved leading to an increasing linear velocity, while an angular acceleration is repeatedly varied in its direction such that an angular velocity is repeatedly build up and reduced.

In this way, the present invention enables to provide a pointing mechanism that requires only one degree of freedom, i.e., a rotational freedom about the rotational axis, for controlling the attitude and the trajectory of a spacecraft. Thus, compared to known configurations, the proposed pointing mechanism requires fewer actuators and position sensors. Accordingly, also the computing effort for operating the proposed pointing mechanism can be reduced. As a result, by reducing the number of degrees of freedom for aligning the thrust vector in order to control the attitude and the trajectory of the spacecraft, the proposed pointing mechanism can be provided with a less complex, relatively lightweight and less expensive design.

In order to achieve the above described technical result, the pointing mechanism preferably is designed in such a way that the thrust vector defined by the mobile plate, upon being rotated about the rotational axis of the rotary actuator, defines a cone, i.e., a circular cone or an oblique circular cone, within which the center of gravity of the spacecraft is disposed.

Further, the pointing mechanism may comprise a control unit configured to control the rotary actuator in order to, upon rotating the connecting element by means of the rotary actuator, set the pointing mechanism into a predefined operating position. In this context, the predefined operating position of the pointing mechanism preferably refers to a position of the mobile plate, in which a predefined position of the thrust vector, in particular relative to the center of gravity of the spacecraft, is defined. The control unit may be provided separately from or integrated into a control unit, particularly a central control unit of the spacecraft. For example, the control unit may be integrated into an attitude and orbit control system (AOCS) of the spacecraft.

Specifically, the control unit may be configured to control the rotary actuator in order to, upon rotating the connecting element by means of the rotary actuator, set the pointing mechanism into a first operating position, in which the thrust vector defined by the mobile plate does not pass through the center of gravity of the spacecraft such that a first torque applied onto the spacecraft is generated, or into a second operating position different from the first operating position, in which the thrust vector defined by the mobile plate does not pass through the center of gravity of the spacecraft such that a second torque applied onto the spacecraft is generated, wherein the first torque and the second torque are directed in opposite directions. Further, in the first operating position and/or the second operating position of the pointing mechanism, the thrust vector may be directed in such a way that it comprises a translational force component and an angular force component acting on the center of gravity of the spacecraft, respectively. Specifically, the translational force component may pass through the center of gravity of the spacecraft, thereby inducing a linear acceleration thereof, whereas the angular force component may be directed perpendicular to the translational force component, thereby generating the first and second torque acting onto the spacecraft. Preferably, the translational force component generated in the first operating position is directed in the same direction compared to the translational force component generated in the second operating position, whereas the angular force component generated in the first operating position is directed in the opposite direction compared to the angular force component generated in the second operating position.

The control unit may be configured to frequently switch the pointing mechanism between its first and its second operating position. In this way, a continuous linear acceleration of the spacecraft may be achieved leading to an increasing linear velocity, while an angular acceleration induced by the first and second torque may be repeatedly varied in its direction. As a result, by such a configuration, the linear velocity of the spacecraft can be controlled without requiring that the thrust vector defined by the mobile plate passes through the center of gravity of the spacecraft.

Specifically, the pointing mechanism may be designed and configured in such a way that, upon rotating the connecting element by 180° about the rotational axis in either direction, the pointing mechanism, starting from its first operating position, is positioned into its second operating position. Accordingly, the pointing mechanism may be designed and configured in such a way that upon rotating the connecting element by 180° about the rotational axis in either direction, the pointing mechanism, starting from its second operating position, is positioned into its first operating position.

In a further development, for ensuring a reliable attitude and trajectory control of the spacecraft, the control unit may be configured to control the rotary actuator in order to switch the pointing mechanism between at least six operating different positions. Specifically, the pointing mechanism may be designed and configured in such a way that, upon rotating the connecting element by 60° about the rotational axis by means of the rotary actuator, the pointing mechanism may be switched successively between a first to a sixth operating position. The first to sixth operating positions may be provided in such a way that along each of the spacecraft principal axes, i.e., the yaw, pitch and roll axes of the spacecraft, a pair of opposite torques, i.e., torques that are directed in opposite directions, may be generated. In this way, a force and thus linear acceleration in direction of at least one of the spacecraft principal axes and torques and thus an angular acceleration about each of the spacecraft principal axes can be controlled by the pointing mechanism, thereby providing a reliable attitude and trajectory control of the spacecraft.

Furthermore, a spacecraft, such as an orbiting satellite, is usually equipped with an attitude control system, such as a reaction wheel unit or a control moment gyroscope, used for rotating a spacecraft about their center of gravity. The attitude control system comprises at least one flywheel which is driven by an electric motor. Flywheels are intended to store rotational energy by transferring torque to them, thereby increasing its rotation speed and thus its angular momentum. Conversely, a flywheel releases stored energy by applying torque to a mechanical load, thereby decreasing its rotation speed. In the attitude control system, flywheels are used to control the orientation of the spacecraft. This is achieved by purposely transferring the angular momentum of the at least one flywheel as torque to the spacecraft when energy is transferred to or from the flywheel, thereby causing the spacecraft to rotate in a desired direction. In other words, when the rotation speed of the flywheel is changed, it generates a torque causing the spacecraft to begin to counter-rotate proportionately through conservation of angular momentum.

According to another aspect of the present invention, the attitude control system of spacecraft may be used to generate at least one compensation torque which is suitable to counteract a torque resulting from switching the pointing mechanism into an operating position, in which the thrust vector defined by the mobile plate does not pass through the center of gravity of the spacecraft. In this way, the compensation torque generated by the attitude control system and the torque resulting from the angular force component of the thrust vector cancel one another such that, as a result, no torque and thus no angular acceleration is applied onto the spacecraft. In order to achieve this result, an angular momentum of the at least one flywheel within the attitude control system needs to be increased or decreased. For example, while a torque resulting from the angular force component of the thrust vector is acting onto the spacecraft, the rotational speed of the at least one flywheel needs to be increased or decreased in order to generate the compensation torque counteracting the torque resulting from the thrust vector. However, as the rotation speed of the at least one flywheel is limited by virtue of its technical design, the at least one flywheel may reach a saturation state, in which the rotation speed of the flywheel has reached a maximum rotation speed. Thus, when the at least one flywheel has reached its saturation state, i.e., maximum rotation speed, it cannot be further accelerated.

Accordingly, in a further development of the pointing mechanism, the control unit may be configured to operate the rotary actuator in response to at least one control parameter transmitted to the control unit from the attitude control system of the spacecraft which is configured to generated at least one compensation torque which in particular is directed parallel to the first and the second torque generated when the pointing mechanism is set into its first operating position or its second operating position. The control parameter may be indicative of a saturation state of the at least one compensation torque of the attitude control system. For example, the control parameter may be indicative of whether or not a current rotation speed of at least one flywheel of the attitude control system has reached a maximum or minimum rotation speed.

Specifically, the control unit may be configured to, upon rotating the connecting element by means of the rotary actuator, set the pointing mechanism into its first operating position when the control parameter falls below a first threshold value and to set the pointing mechanism into its second operating position when the control parameter exceeds a second threshold value being greater than the first threshold value.

For example, when the pointing mechanism is set into its first operating position, the control unit may be configured to control the attitude control system such that it builds up a first compensation torque counteracting the first torque generated by the thrust vector in the first operating position of the pointing mechanism. In order to maintain the spacecraft in a fixed orientation, i.e., without any angular acceleration, the control unit may control the attitude control system in such a way that a rotation speed of at least one flywheel gradually increases so as to generate a first compensation torque which is directed in the opposite direction of the first torque and has the same absolute value. As a result, the first compensation torque and the first torque cancel one another in this state.

However, with a gradually increasing rotation speed of the at least one flywheel, the compensation torque may attain the saturation state, in which, for technical reasons, the at least one flywheel cannot be accelerated to any higher rotation speed. Therefore, when the control parameter which may be indicative of the rotation speed of the at least one flywheel exceeds the second threshold value which may be indicative of a maximum rotation speed of the at least one flywheel, the control unit may be configured to set the pointing mechanism into its second operating position.

Accordingly, in the second operating position of the positioning mechanism, the second torque which is directed opposite to the first torque is generated by means of the thrust vector which does not pass through the center of gravity of the spacecraft. Then, the control unit may be configured to control the attitude control system such that it builds up a second compensation torque counteracting the second torque generated by the thrust vector in the second operating position of the pointing mechanism. Thus, in order to maintain the spacecraft also in this state in a fixed orientation, i.e., without any angular acceleration, the control unit may control the attitude control system in such a way that the rotation speed of the at least one flywheel gradually decreases so as to generate the second compensation torque which is directed in the opposite direction of the second torque and has the same absolute value. As a result, the second compensation torque and the second torque cancel one another in this state.

With a gradually decreasing rotation speed, the compensation torque may attain the saturation state, in which, for technical reasons, the at least one flywheel cannot be decelerated to any lower rotation speed. Therefore, when the control parameter which may be indicative of a rotation speed of the at least one flywheel of the attitude control system falls below the first threshold value which may be indicative of a minimum rotation speed of the at least one flywheel, the control unit may be configured to set the pointing mechanism again into its second operating position.

Accordingly, for controlling the attitude and the trajectory of the spacecraft, as exemplary described above, the control unit may be configured to control the pointing mechanism according to a closed loop or a feedback control.

As a result, although the thrust vector is not aligned by means of the pointing mechanism so as to pass through the center of gravity of the spacecraft, the pointing mechanism is suitable to reliably control the attitude and the trajectory of the spacecraft, while preventing the spacecraft from being subjected to an undesired angular acceleration even over a longer period of operation. At the same time, the pointing mechanism may be provided with a relatively simple, lightweight and less expensive design.

The pointing mechanism is designed such that the thrust vector defined by the mobile plate is inclined relative to the rotational axis of the rotary actuator. A tilt angle between the thrust vector defined by the mobile plate and the rotational axis of the rotary actuator preferably maintains substantially constant when the rotary actuator rotates the connecting element about the rotational axis.

During production and operation of the spacecraft, the mobile plate receiving the thruster and the thruster itself, usually, are subjected to a misalignment which causes an error angle of the thrust vector. This error angle may be estimated and typically has a value of up to 0.2°. Thus, in order to ensure that the thrust vector is inclined relative to the rotational axis, the tilt angle between the thrust vector and the rotational axis preferably is greater than the error angle, i.e., the estimated error angle, of the thruster received on the mobile plate.

Additionally or alternatively, for ensuring a suitable control of the attitude and the trajectory of the spacecraft, the tilt angle between the thrust vector and the rotational axis may be between 0.5° and 5°, and, in particular, may be substantially 2°.

Further, the mobile plate may be designed such that the thrust vector defined by the mobile plate may be substantially perpendicular to the mobile plate, in particular, perpendicular to a surface of the mobile plate which may be configured to receive the thruster. To that end, the mobile plate may be coupled to the connecting element such that the mobile plate is inclined relative to the rotational axis at an inclined angle. Specifically, the inclined angle may correspond to an opposite angle of the tilt angle between the thrust vector and the rotational axis. The inclined angle between the mobile plate and the rotational axis may maintain constant when the rotary actuator rotates the connecting element about the rotational axis.

In the pointing mechanism, the connecting element is provided for coupling the rotary actuator to the mobile plate. The connecting element is preferably
a connecting shaft provided in the form of a cylindrical segment.
Specifically, for providing a weight-optimized design, the connecting shaft may be provided in the form of a hollow cylindrical segment. The connecting shaft may have a first front surface, particularly in the form of a circular surface, which is connected to the rotary actuator. Opposed to the first front surface, the connecting shaft may comprise a second front surface which may be provided in the form of an elliptical surface and/or may be coupled to the mobile plate. The second front surface of the connecting shaft may be inclined relative to the rotational axis, whereas the first front surface of the connecting shaft is arranged perpendicular to the rotational axis.

Further, for coupling the connecting element to the mobile plate, the pointing mechanism may comprise a coupling means having a swashplate which is configured to translate a rotational motion of the connecting element in a reciprocating motion of the mobile plate. In case the connecting element is provided in form of the connecting shaft, the swashplate may be formed by the second front surface of the connecting shaft which may be provided with an oblique angle relative to the rotational axis. Specifically, the coupling means may be designed and configured such that a rotational degree of freedom around the thrust vector between the connecting element and the mobile plate is provided and that forces occurring in a direction along the thrust vector are transmitted between the connecting element and the mobile plate. Accordingly, the connecting means may be designed such that the mobile plate does not rotate with the connecting shaft. In this way, upon rotating the connecting element, the mobile plate may pivot around a pivot axis which passes through an intersection point between the rotational axis of the rotary actuator and a plane of the mobile plate. More specifically, upon rotating the connecting element, the pivot axis of the mobile plate, i.e., around which the mobile plate pivots, rotates within the plane of the mobile plate around the rotational axis, whereas the mobile plate itself does not rotate around the rotational axis.

The coupling means may comprise a bearing, such as a slide bearing or a ball bearing arranged between the connecting element, in particular, the second front surface, and the mobile plate such that a rotational degree of freedom around the thrust vector between the connecting element and the mobile plate may be provided and that forces occurring in a direction along the thrust vector are transmitted between the connecting element and the mobile plate.

Further, the coupling means may comprise an anti-rotating device which is adapted to prevent the mobile plate from being rotated around the rotational axis relative to a spacecraft structure. In other words, the anti-rotating device prevents the mobile plate from being rotated with the connecting element. For example, the anti-rotating device may be provided in form of a movable bearing, via which the mobile plate may be coupled to the spacecraft structure. The movable bearing may be designed and configured such that a translational degree of freedom in a direction along the rotational axis is provided and that a torque occurring in a direction along the rotational axis is transmitted between the mobile plate and the spacecraft structure. By such a configuration, the mobile plate can be reliably prevented from being rotated around the rotational axis relative to the spacecraft structure. In this way, the thruster received on the mobile plate is not subjected to a rotational motion around the rotational axis with regard to the spacecraft structure. This has the advantageous effect that, although a rotary actuator is used for controlling the direction of the thrust vector, the proposed pointing mechanism does not create a significant supplementary complexity for the supply system of the electric propulsion system, such as a propellant supply line for supplying propellant to the thruster. Furthermore, by such a configuration, the proposed pointing mechanism provides a particularly robust and stable structural design and thus, compared to currently used pointing mechanisms, does not require a supplemental securing device for securing the pointing mechanisms, for example, during a takeoff phase for launching the spacecraft from a planetary surface into space.

An electric propulsion system for use in a spacecraft is equipped with the above-described pointing mechanism.

BRIEF DESCRIPTION OF THE DRAWINGS

A preferred embodiment of the invention will now be explained in greater detail with reference to the accompanying schematic drawings, in which.

DETAILED DESCRIPTION OF THE PREFERRED EMBODIMENTS

Figure 1:
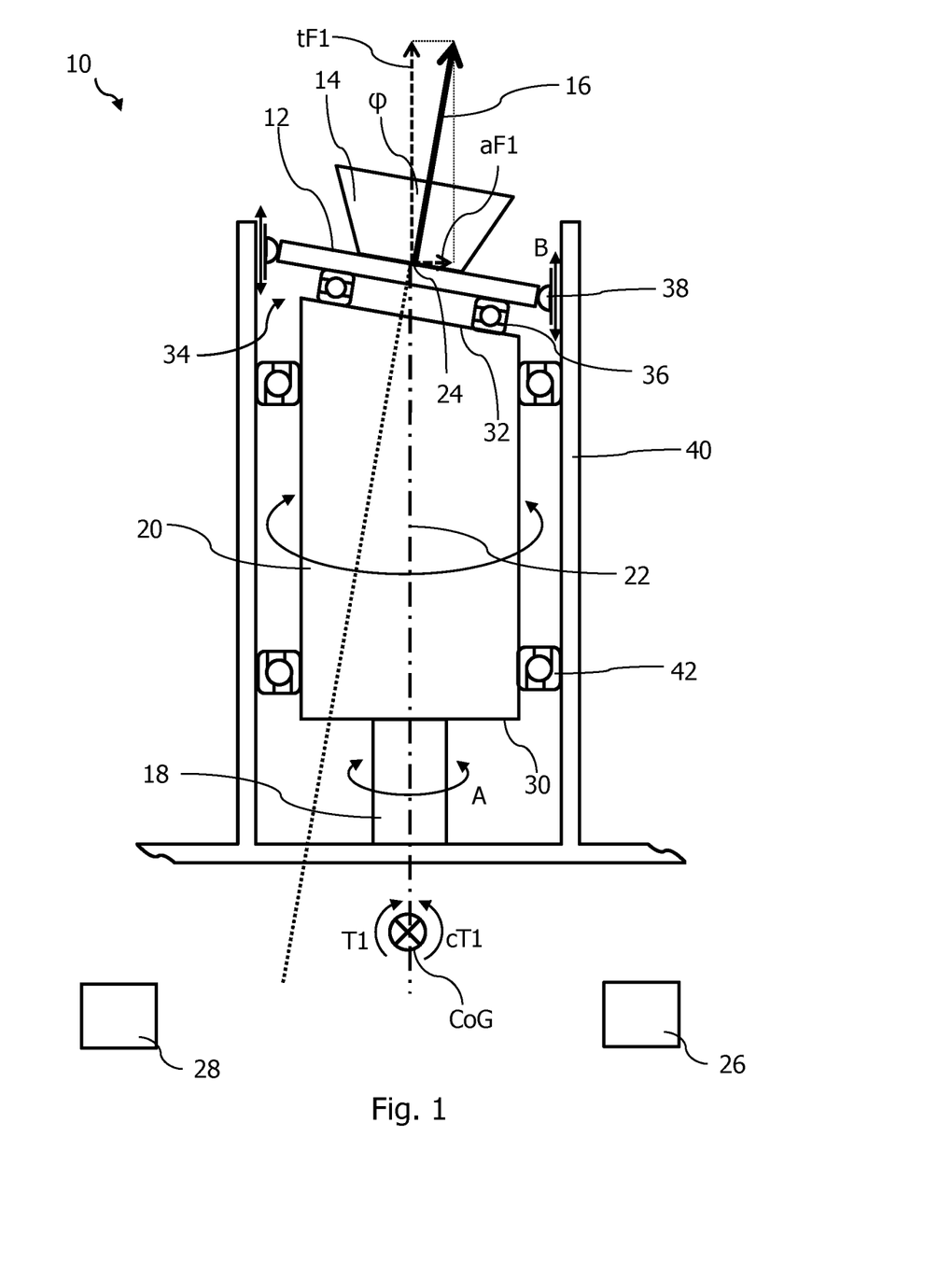
FIG. 1 shows a schematic side view of a pointing mechanism used in an electric propulsion system of a spacecraft in a first operating position.
Figure 2:
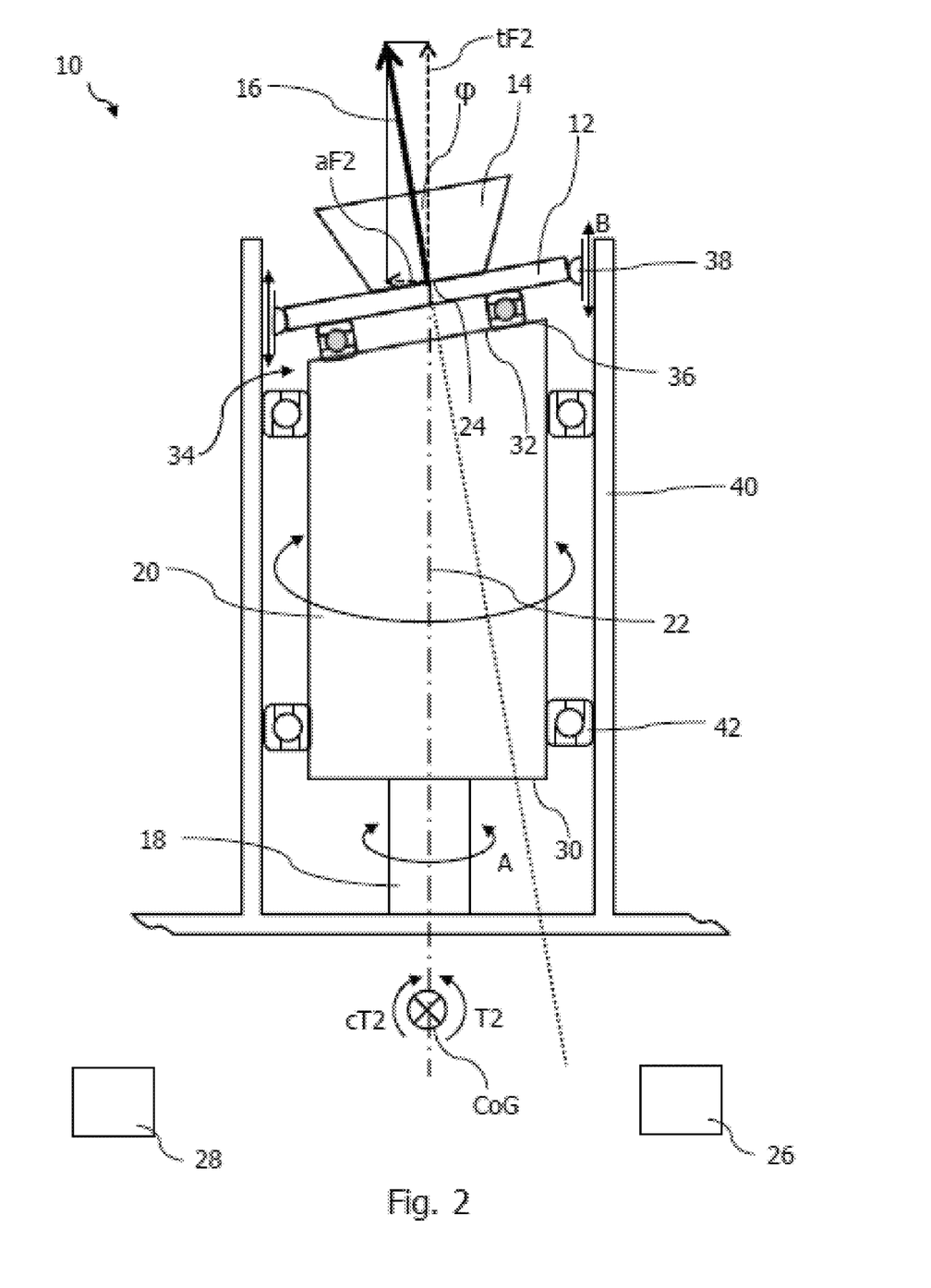
FIG. 2 shows a schematic side view of the pointing mechanism according to FIG. 1 in a second operating position.

FIGS. 1 and 2 show a pointing mechanism 10 used in an electric propulsion system of a spacecraft which comprises a mobile plate 12 adapted to receive a thruster 14, in particular, an ion thruster of the electric propulsion system. In the embodiment depicted in FIGS. 1 and 2, the mobile plate 12 is adapted to receive only one thruster 14. Alternatively, the mobile plate 12 may be configured to receive two or more thrusters. The mobile plate 12 defines a thrust vector 16 generated by the thruster 14 which is received on the mobile plate 12.

The pointing mechanism 10 further comprises a rotary actuator 18 adapted to change the direction of the thrust vector 16 defined by the mobile plate 12 in order control the attitude and the trajectory of the spacecraft. The rotary actuator 18 is coupled to the mobile plate 12 by means of a connecting element 20 and is configured to rotate the connecting element 20 about a rotational axis 22 of the rotary actuator 18 such that the thrust vector 16 defined by the mobile plate 12 rotates about the rotational axis 22, as indicated by the arrow A. More specifically, the thrust vector 16 is inclined relative to the rotational axis 22, wherein thrust vector 16 and the rotational axis 22 intersect each other at an intersection point 24 formed in the mobile plate 12. By such a configuration, upon rotating the connecting element 20, the rotary actuator 18 enables an alignment of a direction of the thrust vector 16 defined by the mobile plate 12 relative to a center of gravity CoG of the spacecraft.

Further, the pointing mechanism 10 comprises a control unit 26 which is configured to control the rotary actuator 18 in order to, upon rotating the connecting element 20 by means of the rotary actuator 18, set the pointing mechanism 10 into a predefined operating position, in which the thrust vector 16 is aligned in a predefined direction relative to the center of gravity CoG of the spacecraft. The control unit 26 is integrated into an attitude and orbit control system of the spacecraft. Alternatively, the control unit 26 may be provided separately from the attitude and orbit control system of the spacecraft.

Specifically, the control unit 26 is configured to control the rotary actuator 18 in order to, upon rotating the connecting element 20 by means of the rotary actuator 18, set the pointing mechanism 10 into a first operating position, as depicted in FIG. 1. In the first operating position, the thrust vector 16 defined by the mobile plate 12 does not pass through the center of gravity CoG of the spacecraft. As a result, a first torque T1 applied onto the spacecraft is generated induced by the thrust vector 16. Further the control unit 26 is configured to control the rotary actuator 18 in order to, upon rotating the connecting element 20 by means of the rotary actuator 18, set the pointing mechanism into a second operating position, as depicted in FIG. 2. In the second operating position, the thrust vector 16 defined by the mobile plate 12 does not pass through the center of gravity CoG of the spacecraft. As a result, a second torque T2 applied onto the spacecraft is generated, wherein the first torque T1 and the second torque T2 are directed in opposite directions.

More specifically, in the first and the second operating position of the pointing mechanism 10, the thrust vector 16 is aligned in such a way that it comprises a translational force component tF1, tF2 and an angular force component aF1, aF2 acting on the center of gravity CoG of the spacecraft, respectively. The translational force component tF1, tF2 passes through the center of gravity CoG of the spacecraft, thereby inducing a linear acceleration thereof, whereas the angular force component aF1, aF2 is directed perpendicular to the translational force component tF1, tF2, respectively, thereby generating the first and second torque T1, T2 applied onto the spacecraft. The translational force component tF1 generated in the first operating position is directed in the same direction compared to the translational force component tF2 generated in the second operating position, whereas the angular force component aF1 generated in the first operating position is directed in an opposite direction compared to the angular force component aF2 generated in the second operating position. In order to achieve this technical result, the pointing mechanism 10 is designed in such a way that the thrust vector 16 defined by the mobile plate 12, upon being rotated about a rotational axis 22 of the rotary actuator 18, defines a cone, within which the center of gravity CoG of the spacecraft is disposed.

The pointing mechanism 10 is designed and configured in such a way that, upon rotating the connecting element by 180° about the rotational axis 22 in either direction, the pointing mechanism 10, starting from its first operating position, is positioned into its second operating position. Accordingly, the pointing mechanism is designed and configured in such a way that, upon rotating the connecting element 22 by 180° about the rotational axis 22 in either direction, the pointing mechanism 10, starting from its second operating position, is positioned into its first operating position.

Preferably, for ensuring a reliable attitude and trajectory control of the spacecraft, the control unit 26 is configured to control the rotary actuator 18 in order to switch the pointing mechanism 10 between at least six different operating positions. Specifically, the pointing mechanism may be designed and configured in such a way that, upon rotating the connecting element by 60° about the rotational axis by means of the rotary actuator 18, the pointing mechanism 10 may be switched successively between a first to a sixth operating position.

Further, the control unit 26 is configured to operate the rotary actuator 18 in response to at least one control parameter transmitted to the control unit 26 from an attitude control system 28 of the spacecraft. The attitude control system 28 of the spacecraft is configured to generate at least a first or a second compensation torque cT1, cT2 depending on the operating position of the pointing mechanism 10, wherein the first compensation torque cT1 is directed in an opposite direction compared to the first torque T1 and the second compensation torque cT2 is directed in an opposite direction compared to the second torque T2. In particular, the control parameter transmitted to the control unit 26 from the attitude control system 28 of the spacecraft is indicative of a saturation state of the at least one compensation torque. Preferably, the attitude control system 28 comprises at least one flywheel, wherein the at least one control parameter is indicative of a rotation speed of the at least one flywheel. The control unit 26 is configured to control the attitude control system 28 such that, when the pointing mechanism 10 is set into its first operating position, the first compensation torque cT1 is generated, and, when the pointing mechanism 10 is set into its second operating position, the second compensation torque cT2 is generated.

More specifically, the control unit is configured to, upon rotating the connecting element 20 by means of the rotary actuator 18, set the pointing mechanism 10 into its first operating position when the control parameter falls below a first threshold value which preferably is a minimum rotation speed of the at least one flywheel of the attitude control system 28 of the spacecraft and to set the pointing mechanism 10 into its second operating position when the control parameter exceeds a second threshold value which preferably is a maximum rotation speed of the at least one flywheel of the attitude control system 28 of the spacecraft. Accordingly, the second threshold value is greater than the first threshold value.

By such a configuration, the pointing mechanism 10 enables the reliable control of the attitude and the trajectory of the spacecraft with only one degree of freedom, i.e., the rotational freedom about the rotational axis 22 of the rotary actuator 18. Even though in the first and the second operating state the thrust vector 16 is aligned such that it does not pass through the center of gravity of the spacecraft, the pointing mechanism 10 further enables the maintenance of the spacecraft in a fixed and stable attitude. Accordingly, the pointing mechanism 10 can be provided with a relatively simple, lightweight and less expensive design.

As depicted in FIGS. 1 and 2, a tilt angle $\varphi$ between the thrust vector 16 defined by the mobile plate 12 and the rotational axis 22 of the rotary actuator 18 maintains constant when the rotary actuator 18 rotates the connecting element 20 about the rotational axis 22. Specifically, the tilt angle $\varphi$ between the thrust vector 16 defined by the mobile plate 12 and the rotational axis 22 of the rotary actuator 18 is 2° which is greater than an error angle of the thrust vector generated by the thruster 14 received on the mobile plate 12.

The mobile plate 12 of the pointing mechanism 10 is designed such that the thrust vector 16 defined by the mobile plate 12 is perpendicular to the mobile plate 12, in particular, to a surface of the mobile plate 12 which is configured to receive the thruster 14. Further, the mobile plate 12 is coupled to the connecting element 20 such that the mobile plate 12 is inclined relative to the rotational axis 22 at an inclined angle which is an opposite angle to the tilt angle $\varphi$ between the thrust vector 16 and the rotational axis 22. Specifically, the mobile plate 12 of the pointing mechanism 10 is designed such that the inclined angle between the mobile plate 12 and the rotational axis 22 maintains constant when the rotary actuator 18 rotates the connecting element 20 about the rotational axis 22.

In the pointing mechanism 10 depicted in FIGS. 1 and 2, the connecting element 20 is a connecting shaft provided in form of a hollow cylindrical segment having a first front surface 30 in the form of a circular surface which is connected to the rotary actuator 18 and a second front surface 32 in the form of an elliptical surface which is coupled to the mobile plate 12. The second front surface 32 of the connecting shaft is inclined relative to the rotational axis 22, whereas the first front surface 30 of the connecting shaft is arranged perpendicular to the rotational axis 22.

For coupling the connecting element 20 to the mobile plate 12, the pointing mechanism 10 further comprises a coupling means 34 having a swashplate which is configured to translate a rotational motion of the connecting element 20 in a reciprocating motion of the mobile plate 12. Specifically, the coupling means 34 is designed and configured such that a rotational degree of freedom around the thrust vector 16 between the connecting element 20 and the mobile plate 12 is provided and that forces occurring in a direction along the thrust vector 16 and the rotational axis 22 are transmitted between the connecting element 20 and the mobile plate 12. In the pointing mechanism 10 according to FIGS. 1 and 2, the swashplate is formed by the second front surface 32 of the connecting element 20. The coupling means 34 further comprises a bearing 36, in particular a ball bearing, arranged between the second front surface 32 of the connecting element 20 and the mobile plate 12 such that a rotational degree of freedom around the thrust vector 16 between the connecting element 20 and the mobile plate 12 is provided and that forces occurring in a direction along the thrust vector 16 and the rotational axis 22 are transmitted between the connecting element 20 and the mobile plate 12. Further, the coupling means 34 may comprise a damper provided between the bearing 36 and the mobile plate 12 for protecting the thruster 14 received on the mobile plate 12 from dynamic loads.

Further, the coupling means 34 comprises an anti-rotating device 38 which is adapted to prevent the mobile plate 12 from being rotated around the rotational axis 22 relative to a spacecraft structure 40. In particular, the anti-rotating device 38 is provided in the form of a movable bearing, via which the mobile plate 12 is coupled to the spacecraft structure 40, the movable bearing being designed and configured such that a translational degree of freedom in a direction along the rotational axis is provided, as indicated by the arrow B, and that a torque occurring in a direction along the rotational axis 22 is transmitted between the mobile plate and the spacecraft structure 40. By such a configuration, the mobile plate 12 can be reliably prevented from being rotated around the rotational axis 22 relative to the spacecraft structure 40. In this way, the thruster 14 received on the mobile plate 12 is not subjected to a rotational motion around the rotational axis 22. Further, the connecting element 20 is supported in the spacecraft structure 40 by means of two angled ball bearings 42 disposed in a row providing a rotational degree of freedom around the rotational axis 22.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A pointing mechanism for use in an electric propulsion system of a spacecraft, the pointing mechanism comprising:
    a mobile plate adapted to receive a thruster and defining a thrust vector of the thruster received on the mobile plate, and
    a rotary actuator coupled to the mobile plate by means of a connecting element, the rotary actuator being configured to rotate the connecting element about a rotational axis of the rotary actuator such that the thrust vector defined by the mobile plate rotates about the rotational axis, wherein the thrust vector is inclined relative to the rotational axis.

2. The pointing mechanism according to claim 1, wherein the pointing mechanism further comprises:
    a control unit configured to control the rotary actuator in order to, upon rotating the connecting element by means of the rotary actuator:
        set the pointing mechanism into a first operating position, in which the thrust vector defined by the mobile plate does not pass through a center of gravity of the spacecraft, such that a first torque applied onto the spacecraft is generated, or
        into a second operating position different from the first operating position, in which the thrust vector defined by the mobile plate does not pass through the center of gravity of the spacecraft, such that a second torque applied onto the spacecraft is generated,
    wherein the first torque and the second torque are directed in opposite directions.

3. The pointing mechanism according to claim 2, wherein the control unit is configured to operate the rotary actuator in response to at least one control parameter transmitted to the control unit from an attitude control system of the spacecraft configured to generate at least one compensation torque which is directed parallel to the first and second torque, the control parameter being indicative of a saturation state of the at least one compensation torque.

4. The pointing mechanism according to claim 3, wherein the control unit is configured to, upon rotating the connecting element by means of the rotary actuator, set the pointing mechanism into its first operating position when the control parameter falls below a first threshold value and to set the pointing mechanism into its second operating position when the control parameter exceeds a second threshold value being greater than the first threshold value.

5. The pointing mechanism according to claim 1, wherein a tilt angle between the thrust vector of the mobile plate and the rotational axis of the rotary actuator is maintained constant when the rotary actuator rotates the connecting element about the rotational axis.

6. The pointing mechanism according to claim 5, wherein at least one of
    the tilt angle between the thrust vector and the rotational axis is greater than an error angle of the thruster vector defined by the mobile plate, or
    the tilt angle between the thrust vector and the rotational axis is between 0.5° and 5°.

7. The pointing mechanism according to claim 5, wherein the tilt angle between the thrust vector and the rotational axis is 2°.

8. The pointing mechanism according to claim 1, wherein at least one of:
    the thrust vector of the mobile plate is perpendicular to the mobile plate, or
    the mobile plate is coupled to the connecting element such that the mobile plate is inclined relative to the rotational axis at an inclined angle which is maintained constant when the rotary actuator rotates the connecting element about the rotational axis.

9. The pointing mechanism according to claim 1, wherein the connecting element is a connecting shaft provided in the form of a cylindrical segment having a first front surface connected to the rotary actuator and a second front surface coupled to the mobile plate.

10. The pointing mechanism according to claim 9, wherein the connection shaft is provided in the form of a hollow cylindrical segment.

11. The pointing mechanism according to claim 9, wherein the first front surface is in the form of a circular surface.

12. The pointing mechanism according to claim 9, wherein the second front surface is in the form of an elliptical surface.

13. The pointing mechanism according to claim 9, wherein the second front surface of the connecting shaft is inclined relative to the rotational axis.

14. The pointing mechanism according to claim 9, wherein the pointing mechanism further comprises a coupling means for coupling the connecting element to the mobile plate, the coupling means having a swashplate configured to translate a rotational motion of the connecting element in a reciprocating motion of the mobile plate.

15. The pointing mechanism according to claim 14, wherein the coupling means is designed and configured such that a rotational degree of freedom around the thrust vector between the connecting element and the mobile plate is provided and wherein forces occurring in a direction along the thrust vector are transmitted between the connecting element and the mobile plate.

16. The pointing mechanism according to claim 15, wherein the coupling means comprises a ball bearing arranged between the connecting element and the mobile plate such that a rotational degree of freedom around the thrust vector between the connecting element and the mobile plate is provided, and wherein forces occurring a direction along the thrust vector are transmitted between the connecting element and the mobile plate.

17. The pointing mechanism according to claim 16, wherein the ball bearing is arranged between the second front surface and the mobile plate.

18. The pointing mechanism according to claim 15, wherein the pointing mechanism further comprises an anti-rotating device which is configured to prevent the mobile plate form being rotated around the rotational axis relative to a spacecraft structure.

19. The pointing mechanism according to claim 18, wherein the anti-rotating device is provided in the form of a movable bearing, via which the mobile plate is coupled to the spacecraft structure, the movable bearing being designed and configured such that a degree of freedom in a direction along the rotational axis is provided and wherein a torque occurring in a direction along the rotational axis is transmitted between the mobile plate and the spacecraft structure.

20. An electric propulsion system for use in a spacecraft equipped with a pointing mechanism according to claim 1.

* * * * *